US010713451B2

(12) United States Patent
Leigh et al.

(10) Patent No.: US 10,713,451 B2
(45) Date of Patent: Jul. 14, 2020

(54) OPTICAL JUMPER

(71) Applicant: Hewlett Packard Enterprise Development LP, Houston, TX (US)

(72) Inventors: Kevin Leigh, Houston, TX (US); Paul Rosenberg, Sunnyvale, CA (US); John Norton, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 30 days.

(21) Appl. No.: 15/746,672

(22) PCT Filed: Jul. 31, 2015

(86) PCT No.: PCT/US2015/043135
§ 371 (c)(1),
(2) Date: Jan. 22, 2018

(87) PCT Pub. No.: WO2017/023248
PCT Pub. Date: Feb. 9, 2017

(65) Prior Publication Data
US 2018/0225487 A1 Aug. 9, 2018

(51) Int. Cl.
G06K 7/10 (2006.01)
G06K 19/07 (2006.01)
G02B 6/42 (2006.01)
G02B 6/38 (2006.01)
G02B 6/44 (2006.01)
H04B 10/40 (2013.01)

(52) U.S. Cl.
CPC ....... *G06K 7/10366* (2013.01); *G02B 6/3895* (2013.01); *G02B 6/4201* (2013.01); *G02B 6/4285* (2013.01); *G02B 6/4293* (2013.01); *G02B 6/4439* (2013.01); *G06K 7/10297* (2013.01); *G06K 19/0723* (2013.01); *G02B 6/4284* (2013.01); *H04B 10/40* (2013.01)

(58) Field of Classification Search
CPC .................................. G06K 7/00; G06K 7/08
USPC .......................................... 235/451, 439, 375
See application file for complete search history.

(56) References Cited

U.S. PATENT DOCUMENTS

| 7,436,310 | B2 | 10/2008 | Flaster |
| 7,605,707 | B2 | 10/2009 | German |
| 8,138,925 | B2 | 3/2012 | Downie |
| 2006/0148279 | A1 | 7/2006 | German |
| 2007/0124001 | A1 | 5/2007 | Opaterny |
| 2010/0052856 | A1 | 3/2010 | Macauley |

(Continued)

OTHER PUBLICATIONS

Wagner, R.E.; "Automatic Discovery of Fiber Optic Structured Cabling Component Locations and Connectivity"; Oct. 5, 2011; 4 pages.

*Primary Examiner* — Edwyn Labaze
(74) *Attorney, Agent, or Firm* — Dicke, Billig & Czaja, PLLC

(57) ABSTRACT

One example of an optical jumper includes an optical cable, a first connector, a second connector, and a tag. The first connector is optically coupled to a first end of the optical cable. The second connector is optically coupled to a second end of the optical cable. The tag is coupled to the first connector and stores data identifying the optical cable, the first connector, and the second connector. The tag is readable by a system with the first connector optically coupled to the system.

20 Claims, 11 Drawing Sheets

(56) References Cited

U.S. PATENT DOCUMENTS

| | | | |
|---|---|---|---|
| 2010/0098425 A1* | 4/2010 | Kewitsch | G02B 6/3895 |
| | | | 398/116 |
| 2012/0000977 A1 | 1/2012 | German et al. | |
| 2013/0188966 A1 | 7/2013 | Wu | |
| 2013/0328666 A1 | 12/2013 | Renfro | |
| 2014/0016901 A1 | 1/2014 | Lambourn | |
| 2017/0034597 A1* | 2/2017 | Shih | H04Q 1/136 |

* cited by examiner

OPTICAL JUMPER

BACKGROUND

Mid-board optical transceiver modules are coupled to other optical transceivers using optical jumpers for optical signal connectivity. An optical jumper includes an optical cable, a near-end connector optically coupled to one end of the optical cable, and a far-end connector optically coupled to the other end of the optical cable. The configuration of the optical jumper may vary based on, for example, the length and type of the optical cable and the connector types.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

For an optical transceiver to function properly with other optical transceivers across an optical jumper, the settings of the optical transceiver (e.g., pre-emphasis levels, filter coefficients) are non-programmatically configured differently based on the configuration of the optical jumper installed. The optical transceiver may also be non-programmatically configured to turn on or turn off portions of the optical transceiver based on the configuration of the optical jumper installed. Non-programmatically adjusting optical transceiver settings of multiple optical transceivers with different optical jumpers for different applications and/or installations, however, may be an error-prone process. One example to non-programmatically configuring or adjusting an optical transceiver is manually configuring or adjusting the optical transceiver.

Accordingly, this disclosure describes examples of an optical jumper for installation in a system including an optical transceiver and a tag reader. The optical jumper includes an optical cable, a near-end (i.e., first) connector optically coupled to a first end of the optical cable for connecting to the optical transceiver, a far-end (i.e., second) connector optically coupled to a second end of the optical cable, and a tag coupled to the near-end connector. The tag is readable by the tag reader of the system when the optical jumper is coupled to the optical transceiver of the system. The tag stores data identifying the optical cable, the near-end connector, and the far-end connector so that the system can automatically configure the optical transceiver based on the stored data.

Figure 1A:
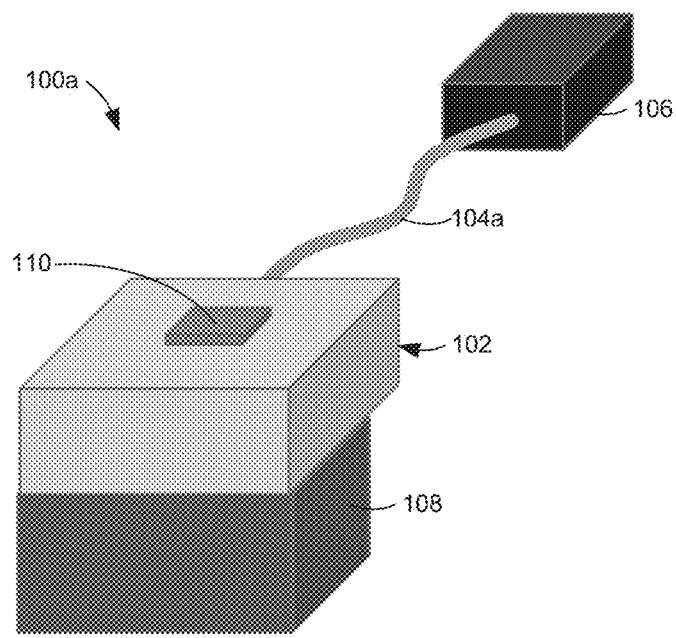
FIGS. 1A and 1B illustrate examples of an optical jumper.

FIG. 1A illustrates one example of an optical jumper 100a. Optical jumper 100a includes a near-end (i.e., first) connector 102, an optical cable 104a, and a far-end (i.e., second) connector 106. Near-end connector 102 is optically coupled to one end of optical cable 104a, and far-end connector 106 is optically coupled to the other end of optical cable 104a. Optical cable 104a includes any suitable number of optical fibers to optically couple near-end connector 102 to far-end connector 106. Near-end connector 102 may include an optical lens block 108. In other examples, optical lens block 108 may be excluded. Near-end connector 102 may be a MT connector, a Prism LT connector, a Prism MT connector, or another suitable connector. Far-end connector 106 may be a MT connector, a Multi-fiber Push-On (MPO) connector, a Lucent Connecter (LC), or another suitable connector. Far-end connector 106 may be installed on a faceplate of a system or connected to another optical transceiver in a system.

Optical jumper 100a also includes a tag 110 coupled to near-end connector 102. Tag 110 includes a non-volatile memory and control logic for accessing the non-volatile memory and for communicating with a tag reader or tag reader/writer of a system. The control logic may include a wireless interface (e.g., Radio Frequency Identification (RFID) interface or Near Field Communication (NFC) interface) or a wired interface (e.g., I$^2$C) to communicate with a tag reader or tag reader/writer of a system when optical jumper 110a is installed in a system.

Tag 110 stores data identifying optical jumper 100a including near-end connector 102, optical cable 104a, and far-end connector 106. In one example, tag 110 is programmed with the data when optical jumper 100a is assembled. The data may identify, for example, at least one of a connector type of near-end connector 102, an optical loss of near-end connector 102, a ferrule lens or physical contact type of near-end connector 102, a number of fiber positions of near-end connector 102, a fiber configuration of near end connector 102, a fiber type of optical cable 104a, a length of optical cable 104a, a connector type of far-end connector 106, an optical loss of far-end connector 106, a ferrule lens or physical contact type of far-end connector 106, a number of fiber positions of far-end connector 106, a fiber configuration of far-end connector 106, a manufacturer of optical jumper 100a, a manufacturing date of optical jumper 100a, and a manufacturing place of the optical jumper 100a. In other examples, the data may identify other attributes of optical jumper 100a.

Figure 1B:
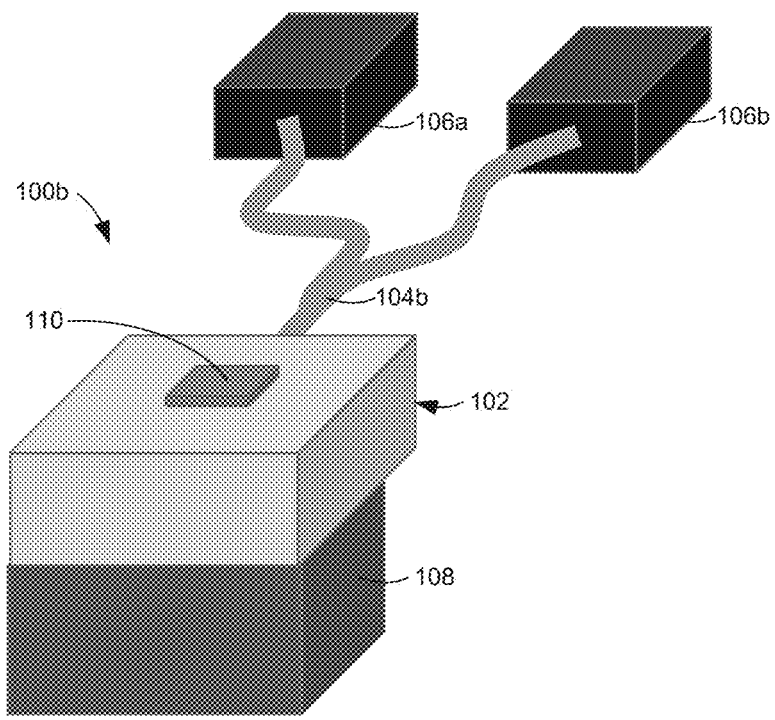

FIG. 1B illustrates another example of an optical jumper 100b. Optical jumper 100b includes a near-end (i.e., first) connector 102, an optical cable 104b, and a plurality of far-end (i.e., second) connectors 106a and 106b. While optical jumper 100b as illustrated in FIG. 1B includes two far-end connectors, in other examples optical jumper 100b may include any suitable number of far-end connectors. In this example, optical cable 104b is a breakout cable. Near-end connector 102 is optically coupled to one end of optical cable 104b, and each far-end connector 106a and 106b is optically coupled to the other end of optical cable 104b. Optical cable 104b includes any suitable number of optical fibers to optically couple near-end connector 102 to each far-end connector 106a and 106b. Near-end connector 102 may include an optical lens block 108. In other examples, optical lens block 108 may be excluded. Each far-end connector 106a and 106b may be a MT connector, a MPO connector, a LC connector, or another suitable connector. Each far-end connector 106a and 106b may be installed on a faceplate of a system or connected to an optical transceiver.

Optical jumper 100b also includes a tag 110 coupled to near-end connector 102 as previously described with reference to FIG. 1A. In this example, in addition to the data described with reference to FIG. 1A identifying the near-end connector and the optical cable, tag 110 may also store the number of far-end connectors, the connector type of each far-end connector 106a and 106b, the optical loss of each far-end connector 106a and 106b, the ferrule lens or physical contact type of each far-end connector 106a and 106b, the number of fiber positions of each far-end connector 106a and 106b, and the fiber configuration of each far-end connector 106a and 106b. In other examples, the data may identify other attributes of optical jumper 100b.

Figure 2:
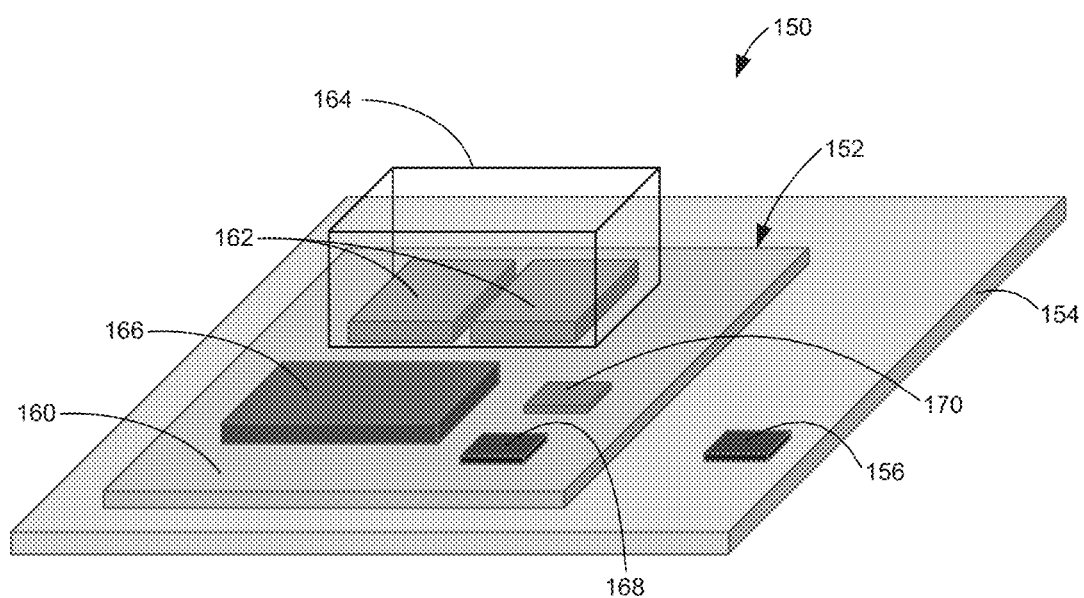
FIG. 2 illustrates one example of a system including an optical transceiver module.

FIG. 2 illustrates one example of a system 150 including an optical transceiver module 152. System 150 includes a system board 154 (i.e., Printed Circuit Board (PCB)) and a management controller 156 electrically coupled to system board 154. Optical transceiver module 152 includes an optical transceiver substrate (e.g., PCB) 160 electrically coupled to system board 154, laser and PIN detector arrays 162, an optical jumper socket 164, a modulator integrated circuit (IC) 166, a management controller 168, and a tag reader/writer 170. The term "tag reader/writer" as used herein may refer to either a tag reader or a tag reader and writer.

Management controller 156 is communicatively coupled to management controller 168 via system board 154 and optical transceiver substrate 160. Management controller 156 and management controller 168 exchange optical transceiver configuration and status information. Laser and PIN detector arrays 162, modulator IC 166, and tag reader/writer 170 are each electrically coupled to optical transceiver substrate 160 and may be electrically coupled to each other via optical transceiver substrate 160. In another example, tag reader/writer 170 is mounted on and electrically coupled to system board 154. Optical jumper socket 164 is mechanically coupled to optical transceiver substrate 160 over laser and PIN detector arrays 162. Optical jumper socket 164 receives a near-end connector of an optical jumper, such as near-end connector 102 of optical jumper 100a or 100b previously described with reference to FIGS. 1A and 1B, to mechanically and optically couple optical transceiver module 152 to the optical jumper.

Tag reader/writer 170 reads the data stored in the tag of an optical jumper, such as tag 110 of optical jumper 100a or 100b previously described with reference to FIGS. 1A and 1B, when the optical jumper is coupled to optical transceiver module 152. Tag reader/writer 170 includes a wireless interface (e.g., RFID interface or NFC interface) or a wired interface (e.g., I$^2$C) to communicate with a tag of an optical jumper when the optical jumper is coupled to optical transceiver module 152. In one example, tag reader/writer 170 communicates the data read from the tag directly to modulator IC 166. In another example, tag reader/writer 170 communicates the data read from the tag to management controller 168, which in turn communicates the data to modulator IC 166. Modulator IC 166 configures itself and laser and PIN detector arrays 162 based on the data. In one example, optical power levels are configured and portions of the modulator IC 166 and laser and PIN detector arrays 162 are either activated or deactivated based on the data. In other examples, other features of modulator IC 166 and laser and PIN detector arrays 162 may be configured to operate in different optical signal wavelengths based on the data read from the tag of the optical jumper.

In one example, in addition to being a tag reader, tag reader/writer 170 is also a tag writer. Tag reader/writer 170 may initially write data to a tag of an optical jumper when the optical jumper is initially installed in system 150 and periodically update the written data. In one example, tag reader/writer 170 may write data to the tag including at least one of an installation date of the optical jumper, an identifier of the system 150, a usage time of the optical jumper, and an optical signal performance of the optical jumper. In another example, tag reader/writer 170 may write other suitable data to the tag of the optical jumper initially upon installation in system 150 and/or periodically after the optical jumper has been installed. In yet another example, tag reader/writer 170 may write other suitable data, as a service event, to the tag of the optical jumper initially before removal of the optical jumper for servicing. The tag may retain a history of the data written to the tag by tag reader/writer 170 with each entry including a time/date stamp.

Figure 3:
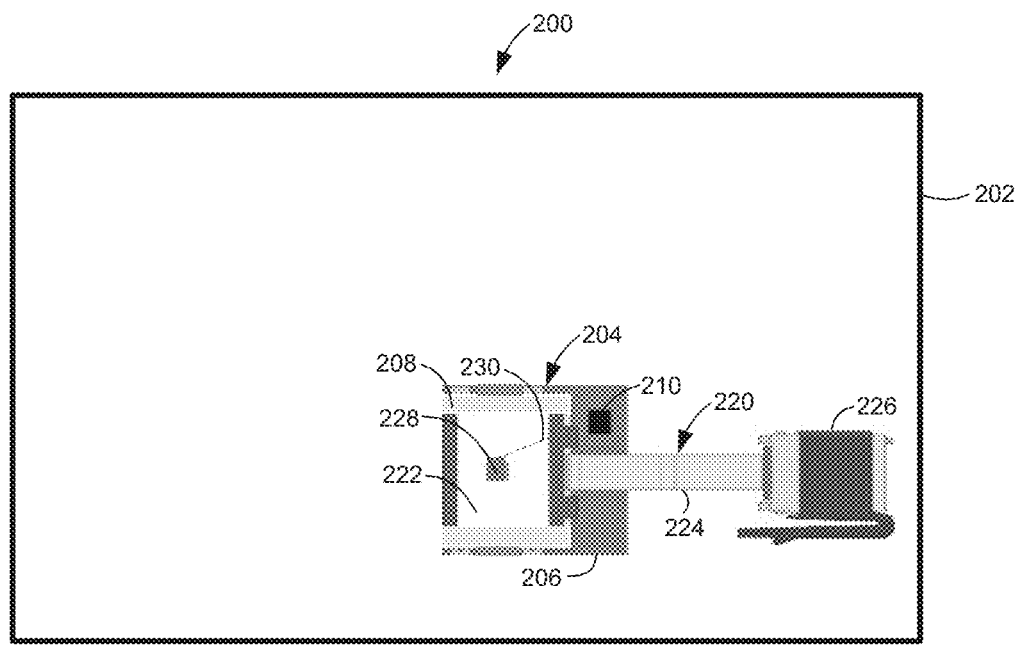
FIG. 3 illustrates a top view of one example of a system with an optical jumper installed.

FIG. 3 illustrates a top view of one example of a system 200 with an optical jumper 220 installed. System 200 includes a system board 202 (e.g., PCB) and an optical transceiver module 204 electrically coupled to system board 202. Optical transceiver module 204 includes an optical transceiver substrate (e.g., PCB) 206, an optical transceiver 208 electrically coupled to optical transceiver substrate 206, and a tag reader/writer 210. Optical transceiver 208 may include a modulator IC, laser and PIN detector arrays, and an optical jumper socket as previously described with reference to FIG. 2. In one example, tag reader/writer 210 is similar to tag reader/writer 170 previously described with reference to FIG. 2.

Optical jumper 220 includes a near-end (i.e., first) connector 222, an optical cable 224, and a far-end (i.e., second) connector 226. Near-end connector 222 is optically coupled to one end of optical cable 224, and far-end connector 226 is optically coupled to the other end of optical cable 224. Optical cable 224 includes any suitable number of optical fibers to optically couple near-end connector 222 to far-end connector 226. Optical jumper 220 also includes a tag 228 coupled to near-end connector 222. In one example, tag 228 is similar to tag 110 previously described with reference to FIG. 1A.

Near-end connector 222 of optical jumper 220 is mechanically and optically coupled to optical transceiver 208. Tag 228 of optical jumper 220 may also be electrically coupled to transceiver module 204. With near-end connector 222 coupled to optical transceiver 208, a communication link indicated at 230 is established between tag 228 and tag reader/writer 210. Communication link 230 may be a wireless communication link (e.g., RFID or NFC) or a wired communication link (e.g., I$^2$C) through optical transceiver module 204 and optical transceiver substrate 206. Tag reader/writer 210 reads tag 228 through communication link 230 to obtain the data identifying optical jumper 220. Optical transceiver 208 may then be configured based on the data read from tag 228.

While an optical jumper 220 having a short optical cable 224 and one type of far-end connector 226 is illustrated in FIG. 3, in other examples optical jumper 220 may include an optical cable having any suitable length and another type of far-end connector or a plurality of far-end connectors.

Figure 4:
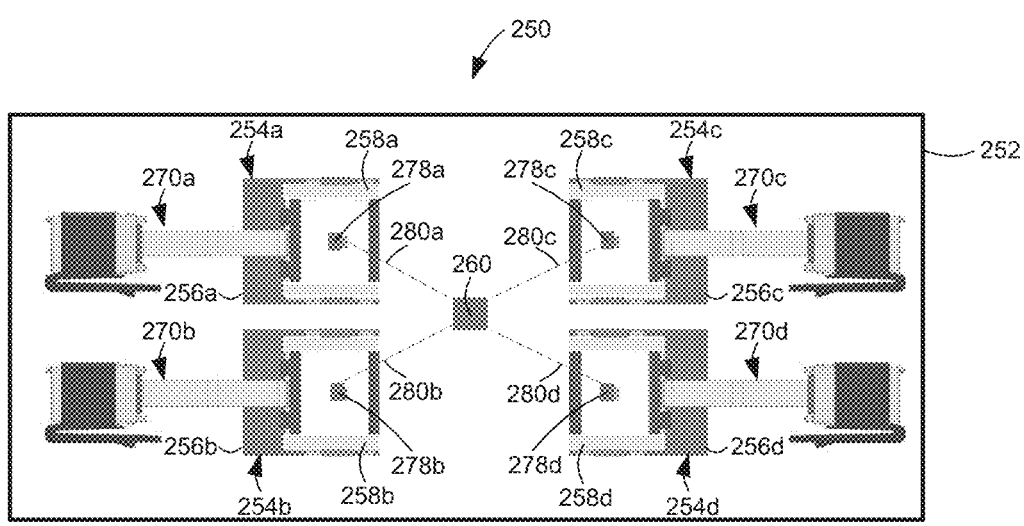
FIG. 4 illustrates a top view of another example of a system with a plurality of optical jumpers installed.

FIG. 4 illustrates a top view of another example of a system 250 with a plurality of optical jumpers 270a-270d installed. System 250 includes a system board 252 (e.g., PCB) and optical transceiver modules 254a-254d and a tag reader/writer 260 electrically coupled to system board 252. Each optical transceiver module 254a-254d includes an optical transceiver substrate 256a-256d and an optical transceiver 258a-258d electrically coupled to the optical transceiver substrate 256a-256d, respectively. Each optical transceiver 258a-258d may include a modulator IC, laser and PIN detector arrays, and an optical jumper socket as previously described with reference to FIG. 2.

Each optical jumper 270a-270d includes a near-end (i.e., first) connector, an optical cable, and a far-end (i.e., second) connector as previously described. Each optical jumper 270a-270d also includes a tag 278a-278d coupled to the near-end connector, respectively. In one example, each tag 278a-278d is similar to tag 110 previously described with reference to FIG. 1A.

The near-end connector of each optical jumper 270a-270d is mechanically and optically coupled to a corresponding optical transceiver 258a-258d. Each tag 278a-278d may also be electrically coupled to tag reader/writer 260 via the corresponding optical transceiver module 254a-254d and system board 252. With each optical jumper 270a-270d coupled to the corresponding optical transceiver 258a-258d, a communication link indicated at 280a-280d is established between each tag 278a-278d and tag reader/writer 260, respectively. Each communication link 280a-280d may be a wireless communication link (e.g., RFID or NFC) or a wired communication link (e.g., I²C) through each optical transceiver module 254a-254d and system board 252, respectively. For a wireless communication link, each tag 278a-278d may be preprogrammed with a relative position with respect to tag reader/writer 260. Tag reader/writer 260 reads each tag 278a-278d through the corresponding communication link 280a-280d to obtain the data identifying each optical jumper 270a-270d, respectively. Each optical transceiver 258a-258d may then be configured based on the data read from each corresponding tag 278a-278d.

Figure 5A:
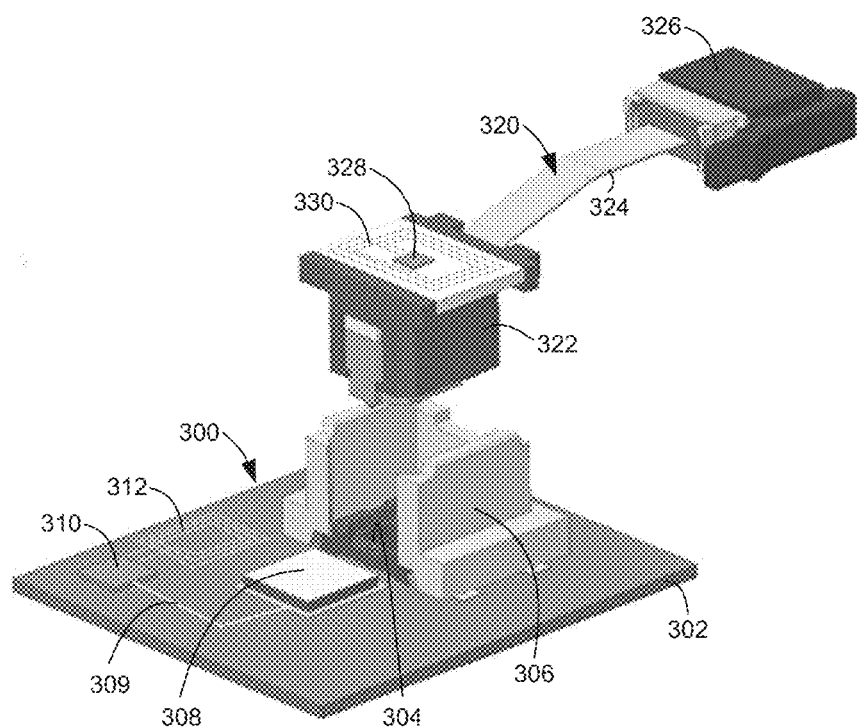
FIGS. 5A and 5B illustrate various views of one example of an optical transceiver module and an optical jumper.
Figure 5B:
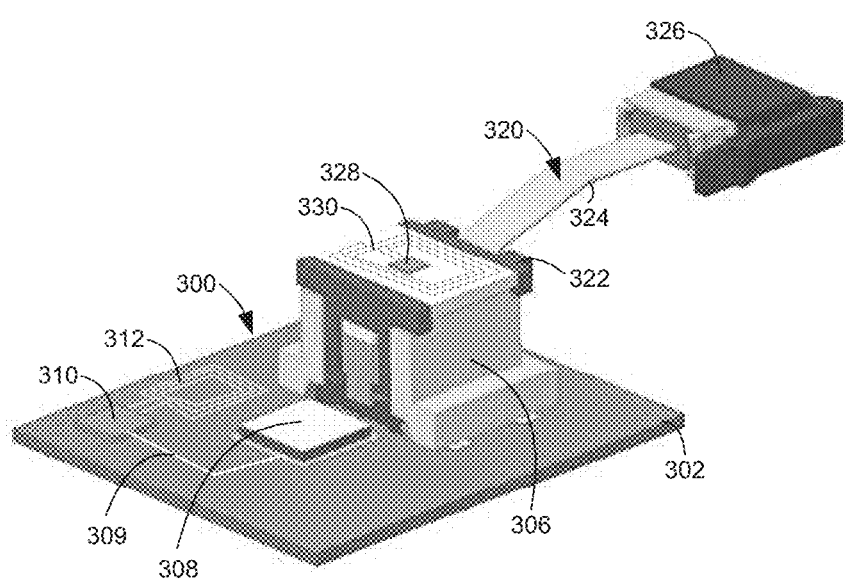

FIG. 5A illustrates an isometric view of one example of an optical transceiver module 300 just prior to installation of an optical jumper 320. FIG. 5B illustrates an isometric view of one example of optical transceiver module 300 with optical jumper 320 installed. Optical transceiver module 300 includes an optical transceiver substrate (e.g., PCB) 302, laser and PIN detector arrays 304, an optical jumper socket 306, a modulator IC 308, and a tag reader/writer 310.

Laser and PIN detector arrays 304, modulator IC 308, and tag reader/writer 310 are each electrically coupled to optical transceiver substrate 302. Laser and PIN detector arrays 304 are electrically coupled to modulator IC 308, and modulator IC 308 is electrically coupled to tag reader/writer 310 through a communication link 309. Tag reader/writer 310 is electrically coupled to an antenna 312 formed on optical transceiver substrate 302. Tag reader/writer 310 is a wireless tag reader/writer, such as an RFID or NFC tag reader/writer. Optical jumper socket 306 is mechanically coupled to optical transceiver substrate 302 over laser and PIN detector arrays 304.

Optical jumper 320 includes a near-end (i.e., first) connector 322, an optical cable 324, and a far-end (i.e., second) connector 326. Near-end connector 322 is optically coupled to one end of optical cable 324, and far-end connector 326 is optically coupled to the other end of optical cable 324. Optical cable 324 includes any suitable number of optical fibers to optically couple near-end connector 322 to far-end connector 326. Optical jumper 320 also includes a tag 328 coupled to near-end connector 322. Tag 328 is electrically coupled to an antenna 330 formed on near-end connector 322. Antenna 330 may be collocated with tag 328 as illustrated in FIGS. 5A and 5B or may be wrapped around near-end connector 322. In one example, antenna 330 may be constructed using copper wire or copper traces (e.g., plated plastic traces). Tag 328 is a passive wireless tag, such as an RFID tag or NFC tag.

As illustrated in FIG. 5B, optical jumper socket 306 receives near-end connector 322 of optical jumper 320 to mechanically and optically couple optical transceiver module 300 to optical jumper 320. With optical jumper 320 installed, tag reader/writer 310 wirelessly reads the data stored in tag 328 of optical jumper 320. Tag reader/writer 310 communicates the data read from tag 328 to modulator IC 308. Modulator IC 308 configures itself and laser and PIN detector arrays 304 based on the data. In one example, optical power levels are configured and portions of the modulator IC 308 and laser and PIN detector arrays 304 are activated or deactivated based on the data. In other examples, other features of modulator IC 308 and laser and PIN detector arrays 304 may be configured to operate in different optical signal wavelengths based on the data read from tag 328 of optical jumper 320.

Figure 6A:
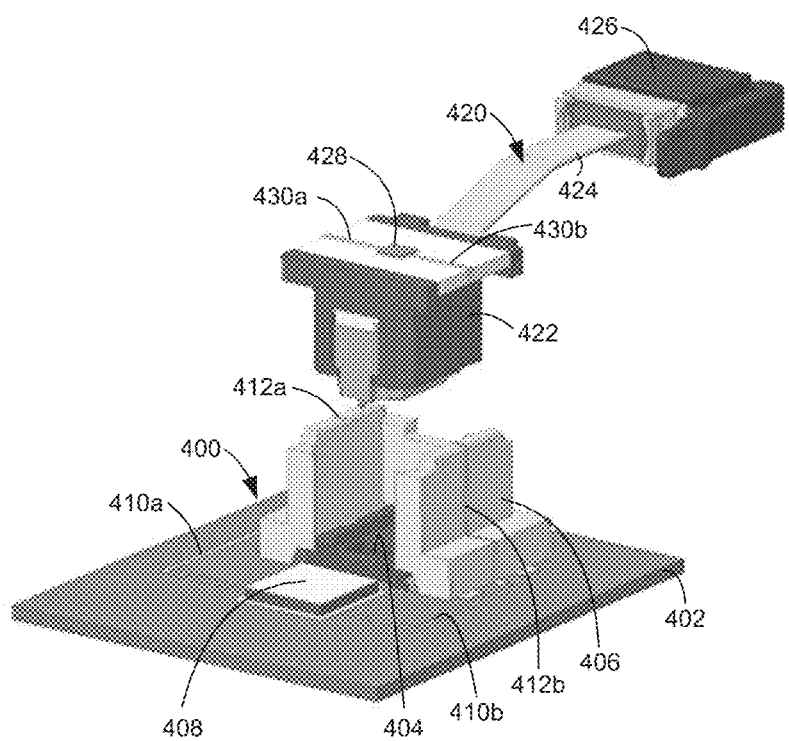
FIGS. 6A-6D illustrate various views of another example of an optical transceiver module and an optical jumper.
Figure 6B:
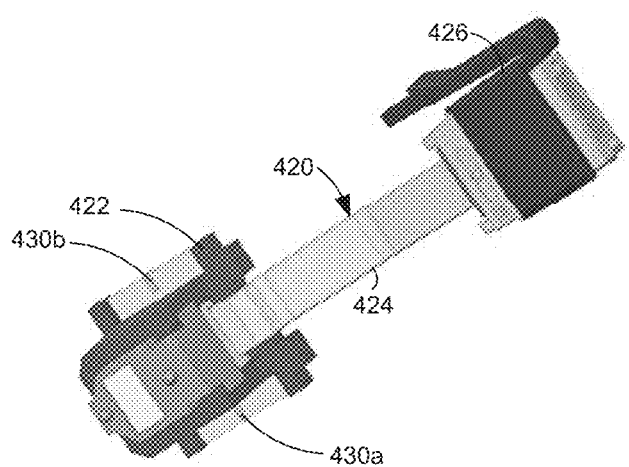
Figure 6C:
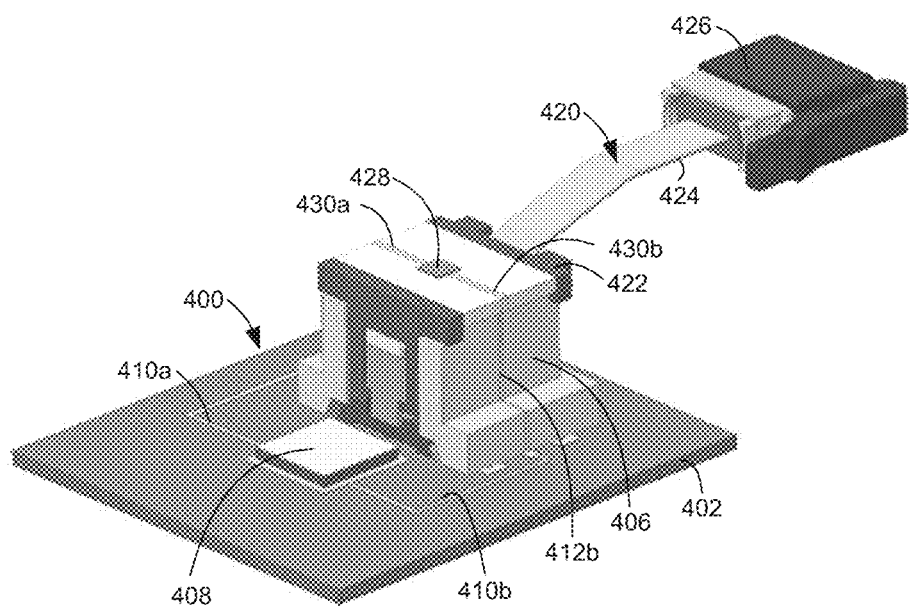
Figure 6D:
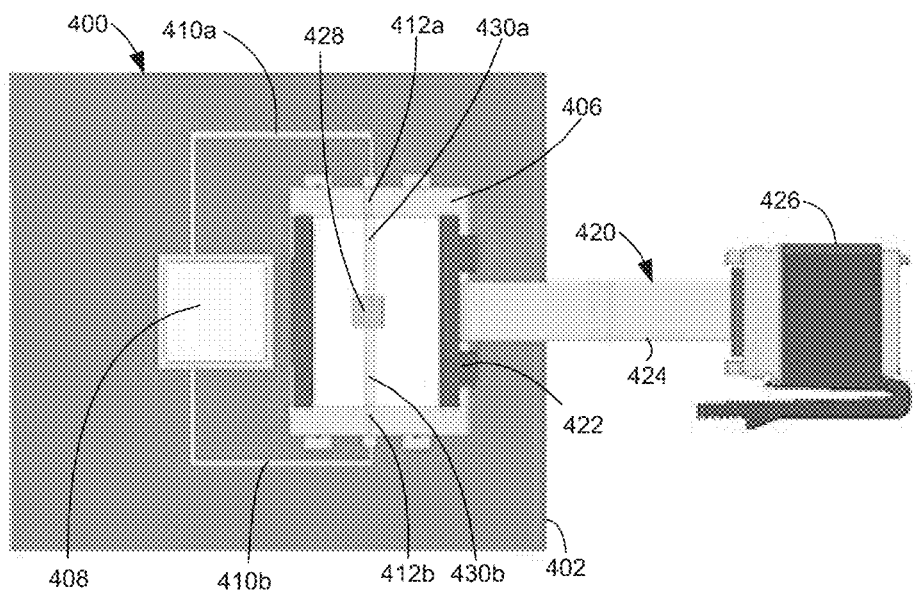

FIG. 6A illustrates an isometric view of one example of an optical transceiver module 400 just prior to installation of an optical jumper 420. FIG. 6B illustrates a bottom isometric view of one example of optical jumper 420. FIG. 6C illustrates an isometric view and FIG. 6D illustrates a top view of one example of optical transceiver module 400 with optical jumper 420 installed. Optical transceiver module 400 includes an optical transceiver substrate (e.g., PCB) 402, laser and PIN detector arrays 404, an optical jumper socket 406, and a modulator IC 408. In this example, a tag reader/writer is integrated into modulator IC 408. In another example, the tag reader/writer may be integrated into a management controller (not shown), and the management controller is communicatively coupled to the modulator IC 408.

Laser and PIN detector arrays 404 and modulator IC 408 are electrically coupled to each other through optical transceiver substrate 402. The tag reader/writer integrated into modulator IC 408 is a wired tag reader/writer via signal traces 410a and 410b of optical transceiver substrate 402. Optical jumper socket 406 is mechanically coupled to optical transceiver substrate 402 over laser and PIN detector arrays 404. Optical jumper socket 406 includes signal traces 412a and 412b extending from the bottom side to the top side of optical jumper socket 406 over the side walls of optical jumper socket 406. On the bottom side of optical jumper socket 406, signal traces 412a and 412b are electrically coupled to signal traces 410a and 410b, respectively. On the top side of optical jumper socket 406, signal traces 412a and 412b may include spring contacts for electrically coupling to signal traces of an optical jumper.

Optical jumper 420 includes a near-end (i.e., first) connector 422, an optical cable 424, and a far-end (i.e., second) connector 426. Near-end connector 422 is optically coupled to one end of optical cable 424, and far-end connector 426 is optically coupled to the other end of optical cable 424. Optical cable 424 includes any suitable number of optical fibers to optically couple near-end connector 422 to far-end connector 426. Optical jumper 420 also includes a tag 428 coupled to near-end connector 422. Tag 428 is electrically coupled to signal traces 430a and 430b formed on near-end connector 422. As illustrated in FIG. 6B, signal traces 430a and 430b extend from tag 428 to an underside portion of near-end connector 422 such that signal traces 430a and 430b electrically contact signal traces 412a and 412b, respectively, when optical jumper 420 is installed. In this example, tag 428 is a passive tag that derives power from signals on signal traces 412a and 412b when optical jumper 420 is installed.

Optical jumper socket 406 receives near-end connector 422 of optical jumper 420 to mechanically and optically couple optical transceiver module 400 to optical jumper 420. With optical jumper 420 installed as illustrated in FIGS. 6C and 6D, signal traces 430a and 430b of near-end connector 422, signal traces 412a and 412b of optical jumper socket 406, and signal traces 410a and 410b of optical transceiver substrate 402 together electrically couple tag 428 to modulator IC 408. The tag reader/writer of modulator IC 408 reads the data stored in tag 428 of optical jumper 420. Modulator IC 408 configures itself and laser and PIN detector arrays 404 based on the data. In one example, optical power levels are configured and portions of the modulator IC 408 and laser and PIN detector arrays 404 are activated or deactivated based on the data. In other examples, other features of modulator IC 408 and laser and PIN detector arrays 404 may be configured to operate in different optical signal wavelengths based on the data read from tag 428 of optical jumper 420.

Figure 7A:
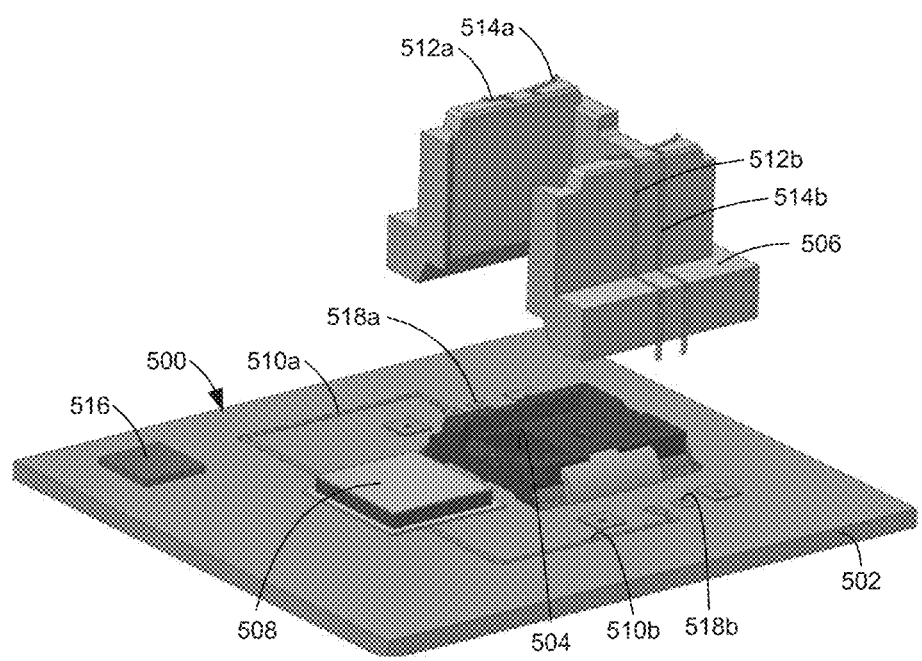
FIGS. 7A-7E illustrate various views of another example of an optical transceiver module and an optical jumper.
Figure 7B:
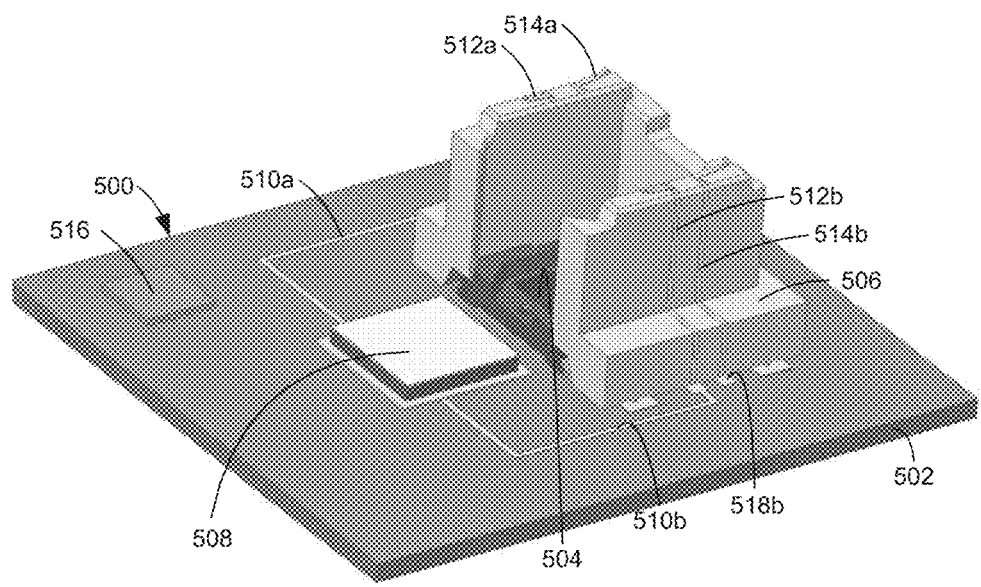
Figure 7C:
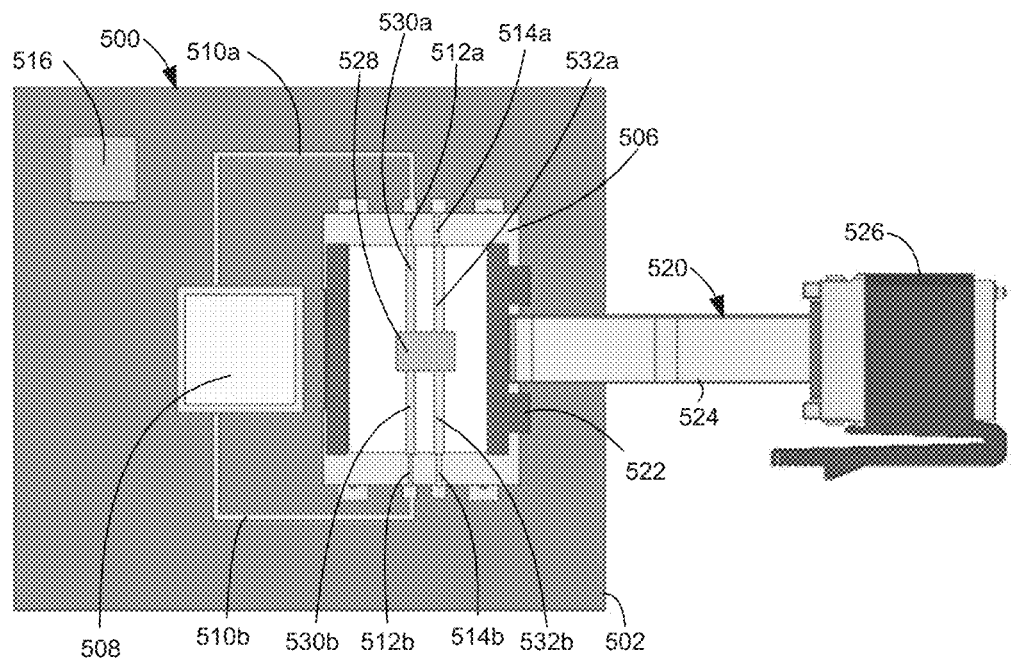
Figure 7D:
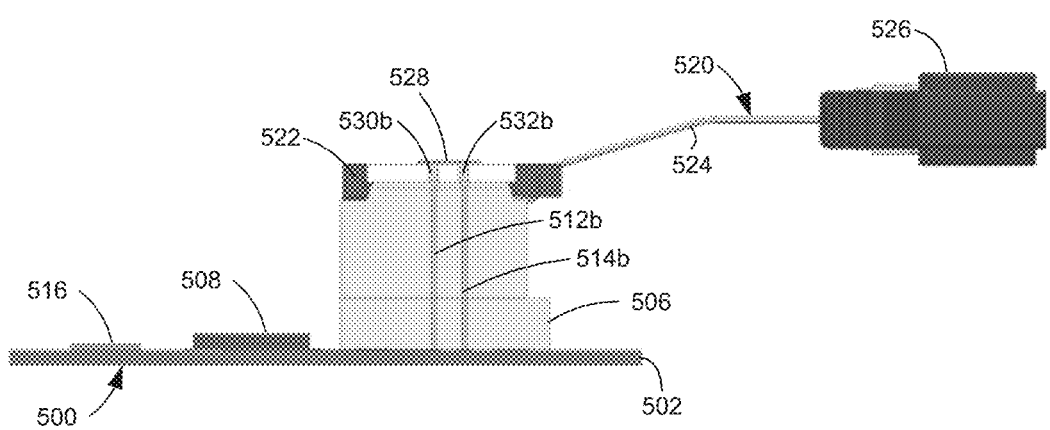
Figure 7E:
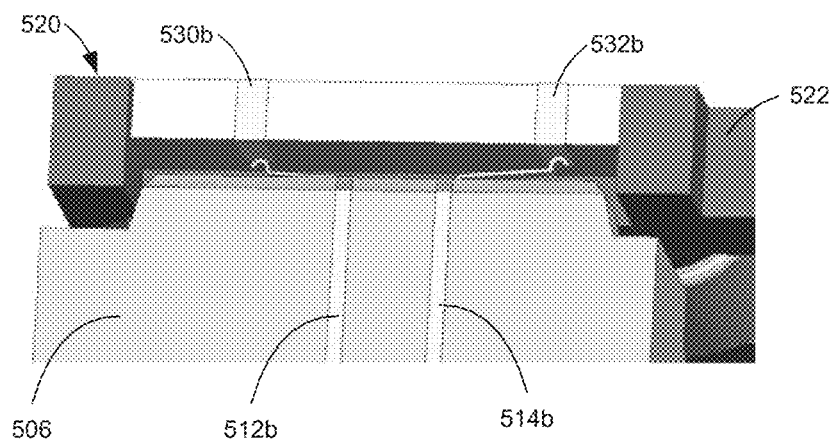

FIG. 7A illustrates an exploded isometric view and FIG. 7B illustrates an isometric view of one example of an optical transceiver module 500. FIG. 7C illustrates a top view, FIG. 7D illustrates a side view, and FIG. 7E illustrates a detail view of one example of optical transceiver module 500 with an optical jumper 520 installed. Optical transceiver module 500 includes an optical transceiver substrate (e.g., PCB) 502, laser and PIN detector arrays 504, an optical jumper socket 506, a modulator IC 508, and a management controller 516. In this example, a tag reader/writer is integrated into modulator IC 508. In another example, the tag reader/writer may be integrated into management controller 516, and management controller 516 is communicatively coupled to modulator IC 508.

Laser and PIN detector arrays 504, modulator IC 508, and management controller 516 are each electrically coupled to optical transceiver substrate 502. Laser and PIN detector arrays 504 are electrically coupled to modulator IC 508 and modulator IC 508 is electrically coupled to management controller 516 through optical transceiver substrate 502. The tag reader/writer integrated into modulator IC 508 is a wired tag reader/writer via signal traces 510a and 510b of optical transceiver substrate 502.

Optical jumper socket 506 is mechanically coupled to optical transceiver substrate 502 over laser and PIN detector arrays 504. Optical jumper socket 506 includes signal traces 512a and 512b and signal traces 514a and 514b extending from the bottom side to the top side of optical jumper socket 506 along the side walls of optical jumper socket 506. On the bottom side of optical jumper socket 506, signal traces 512a and 512b are electrically coupled to signal traces 510a and 510b via mounting pins, respectively. The mounting pins may be through-hole as shown in FIG. 7A or surface-mount. On the top side of optical jumper socket 506, signal traces 512a and 512b may include spring contacts as illustrated in FIG. 7E for electrically coupling to signal traces of an optical jumper. On the bottom side of optical jumper socket 506, signal traces 514a and 514b are electrically coupled to power/ground contacts 518a and 518b (FIG. 7A) via mounting pins, respectively. On the top side of optical jumper socket 506, signal traces 514a and 514b may include spring contacts as illustrated in FIG. 7E for electrically coupling to signal traces of an optical jumper.

Optical jumper 520 includes a near-end (i.e., first) connector 522, an optical cable 524, and a far-end (i.e., second) connector 526. Near-end connector 522 is optically coupled to one end of optical cable 524, and far-end connector 526 is optically coupled to the other end of optical cable 524. Optical cable 524 includes any suitable number of optical fibers to optically couple near-end connector 522 to far-end connector 526. Optical jumper 520 also includes a tag 528 coupled to near-end connector 522. Tag 528 is electrically coupled to signal traces 530a and 530b and electrical power traces 532a and 532b formed on near-end connector 522. As illustrated in FIGS. 7C-7E, signal traces 530a and 530b and electrical power traces 532a and 532b extend from tag 528 to an underside portion of near-end connector 522 such that signal traces 530a and 530b electrically contact signal traces 512a and 512b, respectively, and electrical power traces 532a and 532b electrically contract signal traces 514a and 514b, respectively, when optical jumper 520 is installed. In this example, tag 528 receives power through electrical power traces 532a and 532b when optical jumper 520 is installed.

Optical jumper socket 506 receives near-end connector 522 of optical jumper 520 to mechanically and optically couple optical transceiver module 500 to optical jumper 520. Optical jumper socket 506 includes mechanical retention features (not shown) to secure near-end connector 522 to optical jumper socket 506 and to provide positive and reliable mating pressure between near-end connector 522 and the spring contacts. When near-end connector 522 is fully seated in optical jumper socket 506, the spring contacts are over-driven.

With optical jumper 520 installed as illustrated in FIGS. 7C-7E, signal traces 530a and 530b of near-end connector 522, signal traces 512a and 512b of optical jumper socket 506, and signal traces 510a and 510b of optical transceiver substrate 502 together electrically couple tag 528 to modulator IC 508. The tag reader/writer of modulator IC 508 reads the data stored in tag 528 of optical jumper 520. Modulator IC 508 configures itself and laser and PIN detector arrays 504 based on the data. In one example, optical power levels are configured and portions of the modulator IC 508 and laser and PIN detector arrays 504 are activated or deactivated based on the data. In other examples, other features of modulator IC 508 and laser and PIN detector arrays 504 may be configured to operate in different optical signal wavelengths based on the data read from tag 528 of optical jumper 520.

Figure 8A:
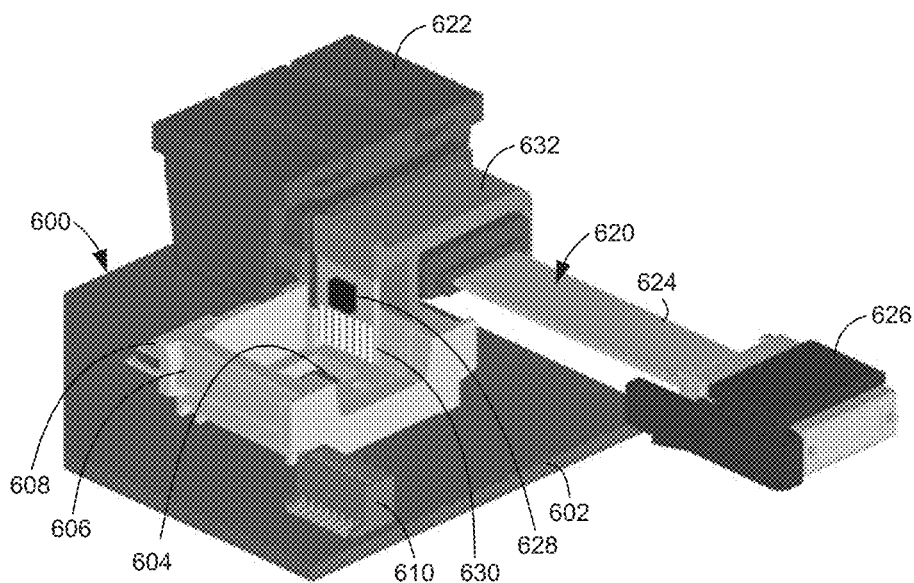
FIGS. 8A and 8B illustrate various views of another example of an optical transceiver module and an optical jumper.
Figure 8B:
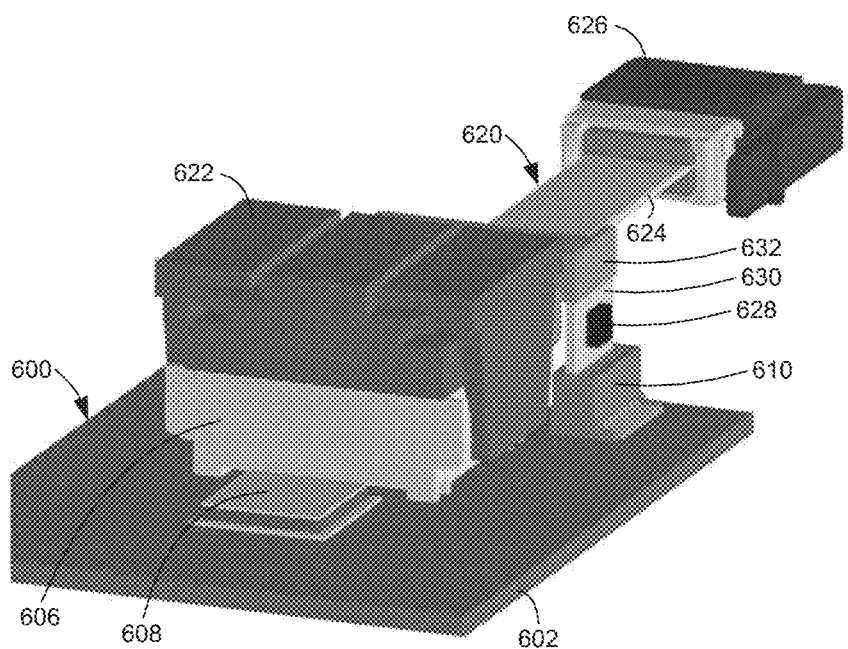

FIG. 8A illustrates an isometric view of one example of an optical transceiver module 600 just prior to installation of an optical jumper 620. FIG. 8B illustrates an isometric view of one example of optical transceiver module 600 with optical jumper 620 installed. Optical transceiver module 600 includes an optical transceiver substrate (e.g., PCB) 602, laser and PIN detector arrays 604, an optical jumper socket 606, a modulator IC 608, and an edge connector 610. In this example, a tag reader/writer is integrated into modulator IC 608. In another example, the tag reader/writer may be integrated into a management controller (not shown), and the management controller is communicatively coupled to the modulator IC 608.

Laser and PIN detector arrays 604 and modulator C 608 are each electrically coupled to optical transceiver substrate 602. Laser and PIN detector arrays 604 are electrically coupled to modulator IC 608 and modulator IC 608 is electrically coupled to edge connector 610 through optical transceiver substrate 602. Optical jumper socket 606 is mechanically coupled to optical transceiver substrate 602 over laser and PIN detector arrays 604.

Optical jumper 620 includes a near-end (i.e., first) connector 622, an optical cable 624, and a far-end (i.e., second) connector 626. Near-end connector 622 is optically coupled to one end of optical cable 624, and far-end connector 626 is optically coupled to the other end of optical cable 624. Optical cable 624 includes any suitable number of optical fibers to optically couple near-end connector 622 to far-end connector 626. Optical jumper 620 also includes a tag 628 electrically coupled to and mounted on a tag board (e.g., PCB) 630. Tag board 630 is removably mechanically coupled to near-end connector 622 via a clip 632 such that tag board 630 and clip 632 may be modularly attached to near-end connector 622. In another example, tag board 630 may be permanently adhered to near-end connector 622. Tag board 630 includes edge contacts electrically coupled to tag 628.

Optical jumper socket 606 receives near-end connector 622 of optical jumper 620 to mechanically and optically couple optical transceiver module 600 to optical jumper 620. With optical jumper 620 installed as illustrated in FIG. 8B, edge connector 610 receives tag board 630 to electrically couple tag 628 to modulator IC 608. The tag reader/writer of modulator IC 608 reads the data stored in tag 628 of optical jumper 620. Modulator IC 608 configures itself and laser and PIN detector arrays 604 based on the data. In one example, optical power levels are configured and portions of the modulator IC 608 and laser and PIN detector arrays 604 are activated or deactivated based on the data. In other examples, other features of modulator IC 608 and laser and PIN detector arrays 604 may be configured to operate in different optical signal wavelengths based on the data read from tag 628 of optical jumper 620.

Figure 9:
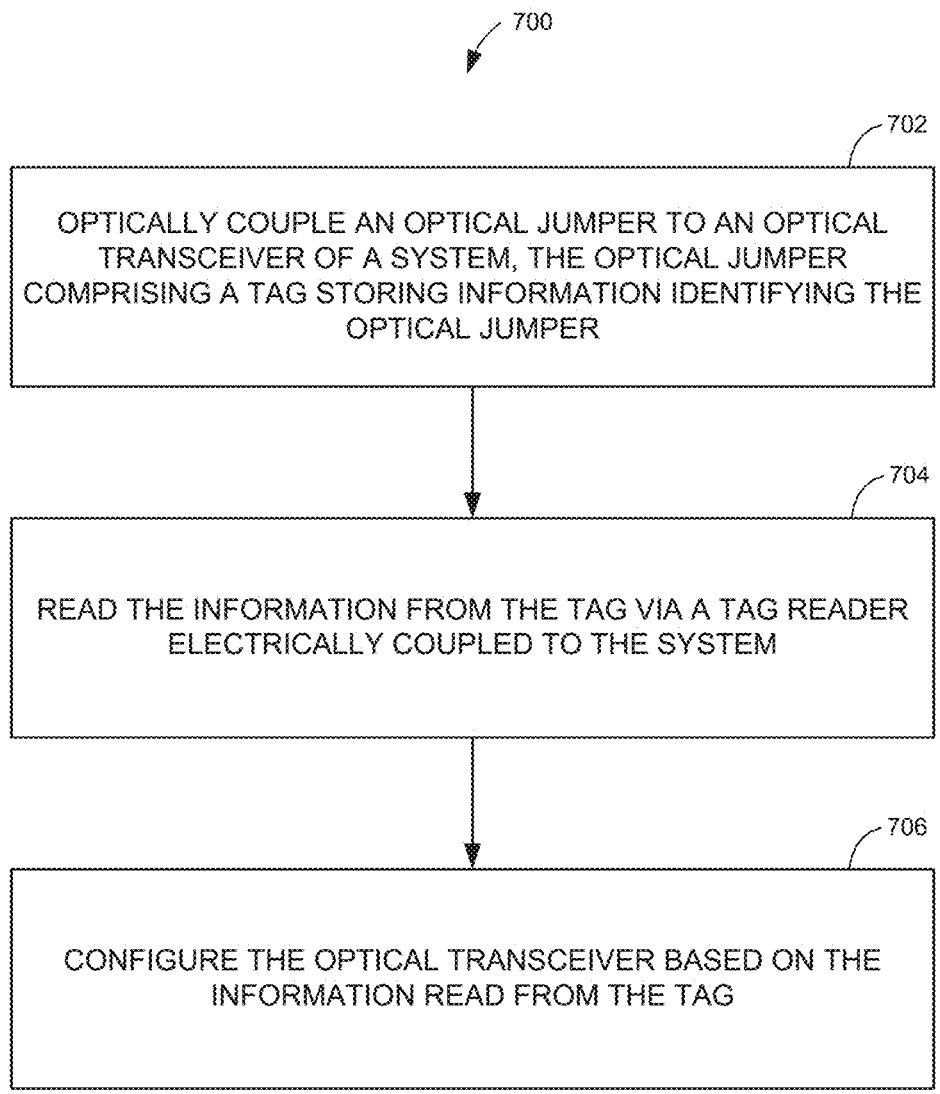
FIG. 9 is a flow diagram illustrating one example of a method for configuring an optical transceiver.

FIG. 9 is a flow diagram illustrating one example of a method 700 for configuring an optical transceiver. At 702, an optical jumper is optically coupled to an optical transceiver of a system, wherein the optical jumper comprises a tag storing information identifying the optical jumper. At 704, information from the tag is read via a tag reader electrically coupled to the system. At 706, the optical transceiver is configured based on the information read from the tag. In one example, configuring the optical transceiver comprises configuring at least one of optical power levels and active portions of the optical transceiver.

The example optical jumpers as described herein enable the same optical transceiver to be used with different optical cable types (e.g., one MPO with 12, 24, or more fibers or multiple LC Duplex). The optical transceivers may be configured without user intervention and may be configured faster and more accurately than manual configuration. Systems including a set of optical transceivers may be reconfigured in the field for different applications (e.g., different faceplate modules). A tag reader/writer may automatically detect optical jumper changes. A tag reader/writer may also write the installed date, system information, optical signal performance, and other data to the tag of the optical jumper to track optical jumper usage in specific systems. This data may be useful for system debugging and warranty repairs. In addition, modularly attachable tags may enable optional tagging of optical jumpers or the upgrading of tags without changing the optical jumper itself.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An assembly comprising:
   an optical jumper including:
   an optical cable;
   a first connector optically coupled to a first end of the optical cable;
   a second connector optically coupled to a second end of the optical cable; and
   a tag coupled to the first connector at the first end of the optical cable and storing data identifying the optical cable, the first connector, and the second connector; and
   a system including a tag reader to read the tag, the system disposed at the first end of the optical cable and communicatively coupled to the tag by the first connector with the first connector optically coupled to the system.

2. The assembly of claim 1, wherein the tag is writable by the system, and
   wherein the data includes at least one of an installation date of the optical jumper, an identifier of the system, a usage time of the optical jumper, and an optical signal performance of the optical jumper.

3. The assembly of claim 1, wherein the tag comprises a wireless interface.

4. The assembly of claim 3, wherein the wireless interface comprises a Radio Frequency IDentification (RFID) interface or a Near Field Communication (NFC) interface.

5. The assembly of claim 1, wherein the first connector comprises signal traces electrically coupled to the tag to communicatively couple the tag to the tag reader of the system with the first connector optically coupled to the system.

6. The assembly of claim 1, wherein the data identifies at least one of a fiber type of the optical cable, a length of the optical cable, a connector type of the first connector, an optical loss of the first connector, a ferrule lens or physical contact type of the first connector, a number of fiber positions of the first connector, a fiber configuration of the first connector, a connector type of the second connector, an optical loss of the second connector, a ferrule lens or physical contact type of the second connector, a number of fiber positions of the second connector, a fiber configuration of the second connector, a manufacturer of the optical jumper, a manufacturing date of the optical jumper, and a manufacturing place of the optical jumper.

7. The assembly of claim 1, further comprising:
   a plurality of second connectors, each second connector optically coupled to the second end of the optical cable, wherein the tag stores data identifying the plurality of second connectors.

8. The assembly of claim 1, further comprising:
   a printed circuit board coupled to the first connector;
   wherein the tag is electrically coupled to the printed circuit board, and wherein the printed circuit board electrically couples the tag to the tag reader of the system with the first connector optically coupled to the system.

9. A system comprising:
a printed circuit board;
an optical transceiver electrically coupled to the printed circuit board; and
a tag reader electrically coupled to the printed circuit board and communicatively coupled to a tag at a first end of an optical jumper to read data stored in the tag, the tag reader disposed at the first end of the optical jumper with the optical jumper optically coupled to the optical transceiver.

10. The system of claim 9, further comprising:
a plurality of optical transceivers electrically coupled to the printed circuit board,
wherein the tag reader is to read data stored in each tag of a plurality of optical jumpers with each optical jumper of the plurality of optical jumpers optically coupled to an optical transceiver of the plurality of optical transceivers.

11. The system of claim 9, wherein the tag reader includes a wireless interface to wirelessly read the tag with the optical jumper optically coupled to the optical transceiver.

12. The system of claim 9, wherein the optical jumper includes a first connector at the first end, and the tag reader is electrically coupled to the tag by signal traces included in the first connector with the optical jumper optically coupled to the optical transceiver.

13. The system of claim 9, wherein the tag reader comprises a tag reader/writer.

14. The system of claim 9, wherein the data includes at least one of an installation date of the optical jumper, an identifier of the system, a usage time of the optical jumper, and an optical signal performance of the optical jumper.

15. The system of claim 9, wherein the data identifies at least one of a fiber type of the optical cable, a length of the optical cable, a manufacturer of the optical jumper, a manufacturing date of the optical jumper, and a manufacturing place of the optical jumper.

16. A method for configuring a system, the method comprising:
optically coupling an optical jumper to an optical transceiver of a system, the optical jumper having a first end and a second end and comprising a tag at the first end storing information identifying the optical jumper;
reading the information from the tag via a tag reader disposed at the first end of the optical jumper and electrically coupled to the tag; and
configuring the optical transceiver based on the information read from the tag.

17. The method of claim 16, wherein configuring the optical transceiver comprises configuring at least one of optical power levels and active portions of the optical transceiver.

18. The method of claim 16, wherein the optical jumper includes a first connector at the first end, and the tag reader is electrically coupled to the tag by signal traces included in the first connector with the optical jumper optically coupled to the optical transceiver.

19. The method of claim 16, wherein the information also includes at least one of an installation date of the optical jumper, an identifier of the system, a usage time of the optical jumper, and an optical signal performance of the optical jumper.

20. The method of claim 16, wherein the information also identifies at least one of a fiber type of the optical cable, a length of the optical cable, a manufacturer of the optical jumper, a manufacturing date of the optical jumper, and a manufacturing place of the optical jumper.

* * * * *